(12) United States Patent
Harada

(10) Patent No.: US 10,799,977 B2
(45) Date of Patent: Oct. 13, 2020

(54) HEATER CHIP, JOINING APPARATUS AND JOINING METHOD

(71) Applicant: KOBO PDA CO., LTD., Nagoya-shi, Aichi (JP)

(72) Inventor: Shinichi Harada, Seto (JP)

(73) Assignee: KOBO PDA CO., LTD., Nagoya-Shi (JP)

( * ) Notice: Subject to any disclaimer, the term of this patent is extended or adjusted under 35 U.S.C. 154(b) by 239 days.

(21) Appl. No.: 15/738,409

(22) PCT Filed: Jul. 19, 2016

(86) PCT No.: PCT/JP2016/071155
§ 371 (c)(1),
(2) Date: Dec. 20, 2017

(87) PCT Pub. No.: WO2017/038282
PCT Pub. Date: Mar. 9, 2017

(65) Prior Publication Data
US 2018/0185953 A1    Jul. 5, 2018

(30) Foreign Application Priority Data

Aug. 28, 2015 (JP) .................................. 2015-168761

(51) Int. Cl.
*B23K 20/00* (2006.01)
*B23K 20/02* (2006.01)
(Continued)

(52) U.S. Cl.
CPC .......... *B23K 20/025* (2013.01); *B23K 1/0016* (2013.01); *B23K 2101/32* (2018.08); *B23K 2101/38* (2018.08)

(58) Field of Classification Search
CPC ................ B23K 1/0016; B23K 20/025; B23K 2101/32; B23K 2101/38
See application file for complete search history.

(56) References Cited

U.S. PATENT DOCUMENTS

2007/0187366 A1    8/2007  Ishii

FOREIGN PATENT DOCUMENTS

| JP | 57-82472 U | 5/1982 |
| JP | 2005-66636 A | 3/2005 |

(Continued)

OTHER PUBLICATIONS

Computer english translation of JP2012-183552A (Year: 2012).*
(Continued)

*Primary Examiner* — Erin B Saad
(74) *Attorney, Agent, or Firm* — Birch, Stewart, Kolasch & Birch, LLP

(57) ABSTRACT

To provide a heater chip which is excellent in energization heat generation characteristic of the ironing portion thereof, and which can efficiently and stably perform a joining process of joining a conducting thin wire to a terminal member. The heater chip comprises an ironing portion located at the lowermost position in a posture of a normal use mode and a pair of connection terminal portions and formed integrally with the ironing portion and extending symmetrically or asymmetrically upward from a left and a right ends of the ironing portion. The ironing portion has a cross-sectional area equal to or smaller than the cross-sectional areas of the connection terminal portions and on the path of a current flowing in the heater chip when energized. A concave portion is formed on one side face of the ironing portion. A thermocouple is attached to the back face of the ironing portion through a protrusion.

8 Claims, 15 Drawing Sheets

(51) Int. Cl.
*B23K 1/00* (2006.01)
*B23K 101/32* (2006.01)
*B23K 101/38* (2006.01)

(56) References Cited

FOREIGN PATENT DOCUMENTS

| | | |
|---|---|---|
| JP | 2007-123647 A | 5/2007 |
| JP | 2009-160617 A | 7/2009 |
| JP | 2010-253503 A | 11/2010 |
| JP | 2012-183552 A | 9/2012 |
| JP | 2013-99779 A | 5/2013 |

OTHER PUBLICATIONS

International Search Report for PCT/JP2016/071155 dated Sep. 27, 2016.
The Office Action dated Mar. 3, 2017 against the corresponding JP Application No. 2016-574301.

* cited by examiner (a) (b)

Fig. 6
(a) 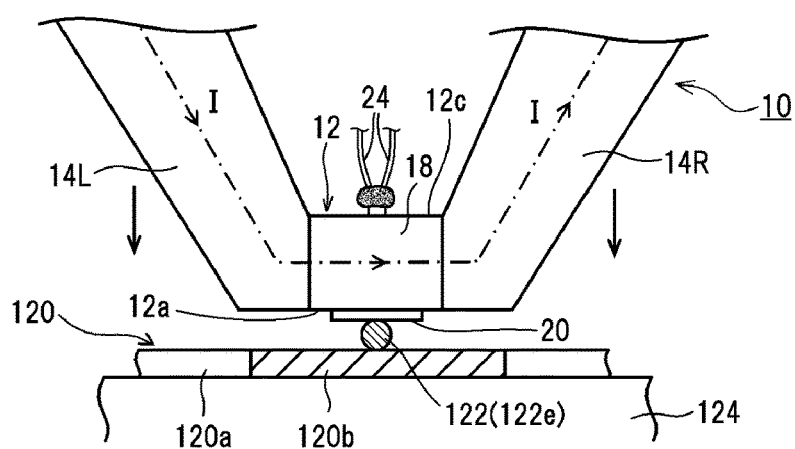
(b) 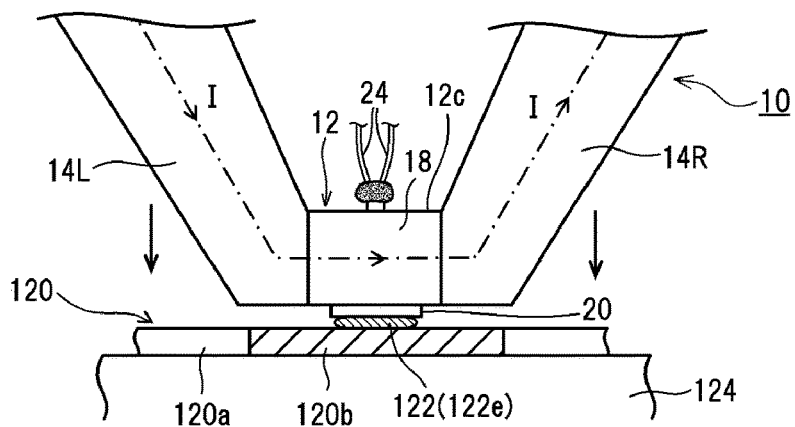
(c) 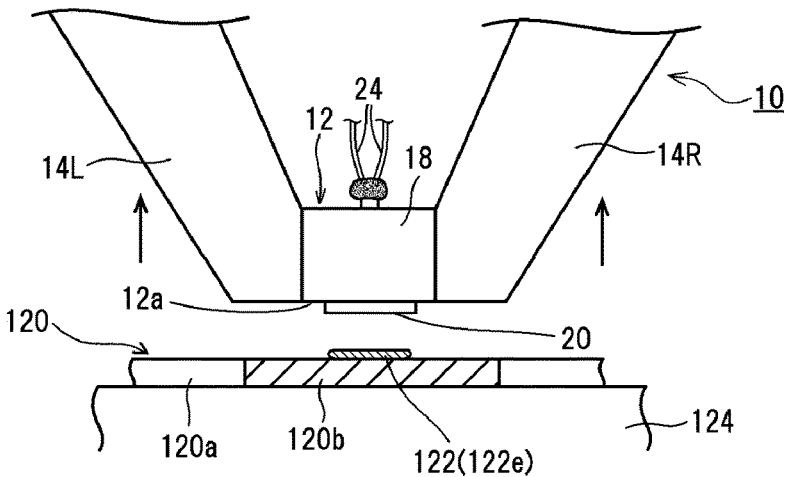

HEATER CHIP, JOINING APPARATUS AND JOINING METHOD

TECHNICAL FIELD

The present invention relates to a heater chip, a joining apparatus and a joining method for use in joining a conducting wire and a terminal member.

BACKGROUND ART

Lead frames are commonly used as a conducting element for electrically connecting an electrical component such as semiconductor device, antenna coil or the like and an external circuit. In general a lead frame has a group of leads to be connected to all external terminals or electrodes of an electrical component, which are repeatedly formed with the same arrangement pattern in one dimensional direction. Lead frames are suitable for mass production of terminal connection processing of electrical components.

Conventionally, in order to join a conducting wire extending from an electrical component or an external circuit to a lead frame, a terminal connection processing method is carried out in which an object to be joined is temporally fixed by thermo-compression bonding and then the fixed object to be joined is stably and strongly joined by laser welding or arc welding. In an automatic bonding apparatus for performing such thermo-compression bonding for temporary fixation, a heater chip shown in FIG. 19 is used as a bonding tool (see, for example, Patent Document 1).

The heater chip 100 of this type has a substantially U-shaped plate body comprising a base metal material such as tungsten or molybdenum having a high-melting point. The heater chip 100 has an ironing portion 102 which protrudes downwards in the concave direction (posture) from the bottom of the body, and a left and a right connection terminal portions to be attached to a heater head 110. In the heater head 110 as shown, the left and right connection terminal portions 104L and 104R of the heater chip 100 are connected physically and electrically to side surfaces of a pair of power feeding conductors 106L and 106R which lead to a heater power supply (not shown). The heater head 110 comprises an elevating mechanism (not shown) that serves to move the heater chip 100 up and down via the power feeding conductors 112L and 112R and a pressurizing mechanism (not shown) that serves to press the heater chip 100 against an object to be joined. An insulator 116 is inserted between the power feeding conductors 112L and 112R.

FIG. 19 shows an example of lead frame 120 which is, for example, made of copper alloy and which comprises a rod-like frame portion 120a and a plurality of T-shaped terminal piece portions 120b projecting at regular intervals from one side surface along the length direction of the frame portion 120a. A conducting wire 122 extending from an electrical component (not shown) has been placed on each of the terminal piece portions 120b, to which the wire 122 is to be joined, by a mounter (not shown).

When the heater head 110 lowers the heater chip 100, an iron tip face (bottom face) 102a of the ironing portion 102 comes in contact under an appropriate pressure with a conducting wire 122 placed on one of the terminal piece portions 120b of the lead frame 120 positioned directly under the ironing portion 102 as shown in FIG. 20. The lead frame 120 is supported from below by an electrically insulating support jig 124.

In the state where the ironing portion 102 of the heater chip 100 is pressed against the object (122,120b) to be joined, the heater power supply turns on to supply an electric current to the heater chip 100. Then, the ironing portion 102 of the heater chip 100 generates heat by resistance heating and heats the object (122,120b) to be joined. Thus, an insulating film of the conducting wire 122 melts in the heat to peel off, and the exposed portion of the conducting wire 122 receives both the heat and the pressurizing force from the heater chip 100 at the same time so as to be plastically deformed, resulting in connection with the terminal piece portion 120b by thermo-compression bonding.

When a certain period of time (energization time) has elapsed, the heater power supply stops energization. After lapse of another period of time (holding time), the heater head 110 raises up the heater chip 100 to separate from the object (122,120b) to be joined. The above thermo-compression bonding operation is repeatedly carried out for all the objects (122,120b) to be joined on the lead frame 120.

The conventional heater chip 100 as described above is also frequently used in reflow soldering.

PRIOR ART DOCUMENT

Patent Document

Patent Document 1: Japanese Laid-Open Patent Publication No. 2005-66636

SUMMARY OF THE INVENTION

Problem to be Solved by the Invention

As described above, in application of joining the conducting wire 122 to the lead frame 120, the conventional heater chip 100 is used in the process of thermo-compression bonding for temporal fixation while the main or formal joining process is carried out by means of laser welding or arc welding. Besides, dip soldering is often used in which the conducting wire 122 is wound around the terminal piece portion 120b of the lead frame 120 and then dipped in a solder bath. There has been not known so far any formal joining process of thermo-compression bonding necessitating neither of laser welding, arc welding or dip soldering.

The reason is that the heating efficiency of the ironing portion 102 of the heater chip 100 is too low to raise up the heat supplied to the object (122,120b) to be joined from the ironing portion 102 to a high temperature at a high speed in accordance with a pressurizing force applied to the object (122,120b) to be joined by the heater head 110. The lead frame 120 has a tendency to provide a high heat dissipation (heat conductivity). Unless the heating temperature of the ironing portion 102 rises up so rapidly as to overcome the heat drawing on the lead frame 120, it is difficult to promote the diffusion boding and obtain a stable and strong junction in the object (122,120b) to be joined.

To solve the problem, such a method is conceivable of measuring the temperature of the ironing portion 102 of the heater chip 100 by means of a temperature sensor, for example, a thermocouple (not shown) and controlling the power supplied to the heater chip 100 to a greater extent so that the output (measured temperature) of the thermocouple becomes a desired value. However, since the thermocouple is usually attached to a part of the ironing portion 102 distant from the iron tip face 102a, a certain degree of deviation exists between the temperature of the part of the ironing portion 102 measured by the thermocouple and the actual temperature of the iron tip face 102a. In a case where the heat drawing on the object to be joined is large like the lead frame, the actual temperature of the iron tip face 102a is often significantly and indefinitely below the set value even if the monitoring result obtained from the thermocouple is as set value. When the reliability of the iron tip temperature monitoring is low, the thermocouple is useless.

In reflow soldering which is another application for a heater chip, it is necessary to appropriately control melting and creeping of a solder applied in advance on the terminal member. However, in a case of using the conventional heater chip 100 with a poor responsiveness of energization heat generation around the iron portion thereof, there is a problem that even if the current is controlled at a high speed and finely on the heater power supply side, a successful and precise joining is difficult to obtain.

The present invention has been made to solve the above-described problems of the prior art, and it is an object to provide a heater chip which is excellent in energization heat generation characteristic of the ironing portion thereof, and which can efficiently and stably perform a joining process of joining a conducting thin wire to a terminal member, and it is another object to provide a joining apparatus and a joining method using the heater chip.

Means for Solving the Problem

A heater chip of the present invention is a heater chip for joining a conduction thin wire to a terminal member, comprising: an ironing portion that abuts or comes into contact with one end portion of the conducting wire disposed on the terminal member; and a pair of connection terminal portions that are integrally formed with the ironing portion and that extend symmetrically or asymmetrically from the left and right ends of the ironing portion so as to make a physical and electrical connection with power feeding conductors from a heater power supply; wherein the ironing portion has an iron tip face opposed to the conducting wire and the terminal member, and a side face continuous with the iron tip face and having a concave portion; and wherein the ironing portion has a cross-sectional area over the entire section thereof equal to or smaller than the cross-sectional areas of the connection terminal portions on the path of a current flowing when energized.

In accordance with the above configuration in which the cross-sectional area of the ironing portion over the entire section thereof is restricted to be equal to or smaller than the cross-sectional areas of both the connection terminal portions on the path of a current flowing when the heater chip is energized, and in which while the concave portion is formed on at least one side face of the ironing portion, it is capable to greatly improve the energization heat generation characteristic or the temperature characteristic (rising characteristic and falling characteristic) of the ironing portion (especially in the vicinity of the iron tip face) and to successfully and reliably accomplish the joining process of joining the conduction thin wire to the terminal member.

In a preferred embodiment, the concave portion opens at the side of the iron tip face and extends from the iron tip face to the back face opposite thereto of the ironing portion. In this configuration, since the ironing portion is efficiently narrowed, concentration of current or resistance heating on the ironing portion is further increased, and the heating characteristic and cooling characteristic of the ironing portion is further improved.

In another preferred embodiment, a temperature sensor, typically a thermocouple, is attached to the back face opposite to the iron tip face of the ironing portion, preferably at the central position in the left and right direction thereof, or a fin-shaped or block-shaped protruding heat radiation member is provided on the back face. By the above configuration in which the thermocouple is attached to or the heat radiation member is provided on the back face of the ironing portion, Joule heat generated in the vicinity of the back face of the ironing portion is promptly released to the outside and as a reaction the concentration of heat on the iron tip face of the ironing portion is promoted, and thereby the heating performance of the iron portion with respect to the object to be joined is further improved. In this case, the configuration in which the concave portion is continuous from the iron tip face to the back face on the opposite side is more desirable for the reason that the correspondence relationship between the temperature (heating temperature) of the iron tip face and the measured temperature of the thermocouple is so good that the accuracy and reliability of the iron tip temperature monitoring by the thermocouple can be further improved.

In another preferred embodiment, on the iron tip face of the ironing portion, there is formed a convex face portion as a region which is to be in contact with the conducting thin wire and to be polished. When cleaning the iron tip face, it is sufficient to polish only the region of the convex face portion, requiring the minimum polishing operation.

In another preferred embodiment, sintered metal or sintered alloy is used for the material of the ironing portion and the connection terminal portions. According to such configuration, no crack or peeling is likely to occur even when the iron tip face wears and deteriorates (oxidizes) due to many times of use, and so the life of the heater chip can be prolonged.

A joining apparatus according to the invention comprises the heater chip of the invention, a heater head for supporting the heater chip and bringing an iron tip face of an ironing portion of the heater chip into contact with a conducting thin wire on a terminal member when joining the conducting thin wire to the terminal member; and a heater power supply for supplying a current for resistant heat generation to the heater chip.

In the joining apparatus having the above configuration, because of using the heater chip of the invention as a joining tool, the efficiency and reliability of the joining process for joining the conducting thin wire and the terminal member and the resultant productivity are improved in either of thermo-compression bonding or reflow soldering.

A joining method according to a first aspect of the invention is a joining method for joining a conducting thin wire to a terminal member using a joining apparatus of the invention, comprising: a first step of disposing the conducting thin wire on the terminal member; a second step of controlling the heater head to bring the ironing portion of the heater chip into contact with the conducting thin wire on the terminal member and applying a predetermined pressurizing force to the conducting thin wire and the terminal member; a third step of controlling the heater power supply to energize the heater chip and making the conducting wire close contact with the terminal member by the heating and the pressurizing force from the ironing portion to promote diffusion bonding; and a fourth step of controlling the heater power supply to stop energization of the heater chip at a predetermined timing and after lapse of a predetermined time controlling the heater head to separate the ironing portion from the conducting wire. This joining method exerts a great advantage especially when the terminal member comprises a member providing a large heat drawing, for example, a lead frame.

A joining method according to a second aspect of the invention is a joining method for joining a conducting thin wire to a terminal member using a joining apparatus of the invention, comprising a first step of disposing the conducting thin wire on the terminal member via solder; a second step of controlling the heater head to bring the ironing portion of the heater chip into contact with the conducting thin wire on the terminal member and applying a predetermined pressurizing force to the conducting wire and the terminal member; a third step of controlling the heater power supply to energize the heater chip and melting the solder by the heating of the ironing portion; and a fourth step of controlling the heater power supply to stop energization of the heater chip at a predetermined timing and after lapse of a predetermined time controlling the heater head to separate the ironing portion of the heater chip from the conducting wire.

Effect of the Invention

According to the heater chip of the invention that comprises the configuration and operation described above, the energization heat generation characteristic of an iron portion of a heater chip (especially in the vicinity of an iron tip face) can be improved, and joining process of joining a conducting wire to a terminal member can be efficiently and reliably performed.

Further, according to the joining apparatus or the joining method of the invention that uses the heater chip of the invention, it is permitted to improve the quality and productivity of joining process of joining a conducting wire to a terminal member.

BRIEF DESCRIPTION OF DRAWINGS

FIG. 6 is a partial sectional view showing each step of process of the thermo-compression bonding.

MODES FOR CARRYING OUT THE INVENTION

Hereinafter, preferred embodiments of the present invention will be described with reference to FIGS. 1 to 18.
[Configuration of Heater Chip and Joining Apparatus in Embodiment]

Figure 1:
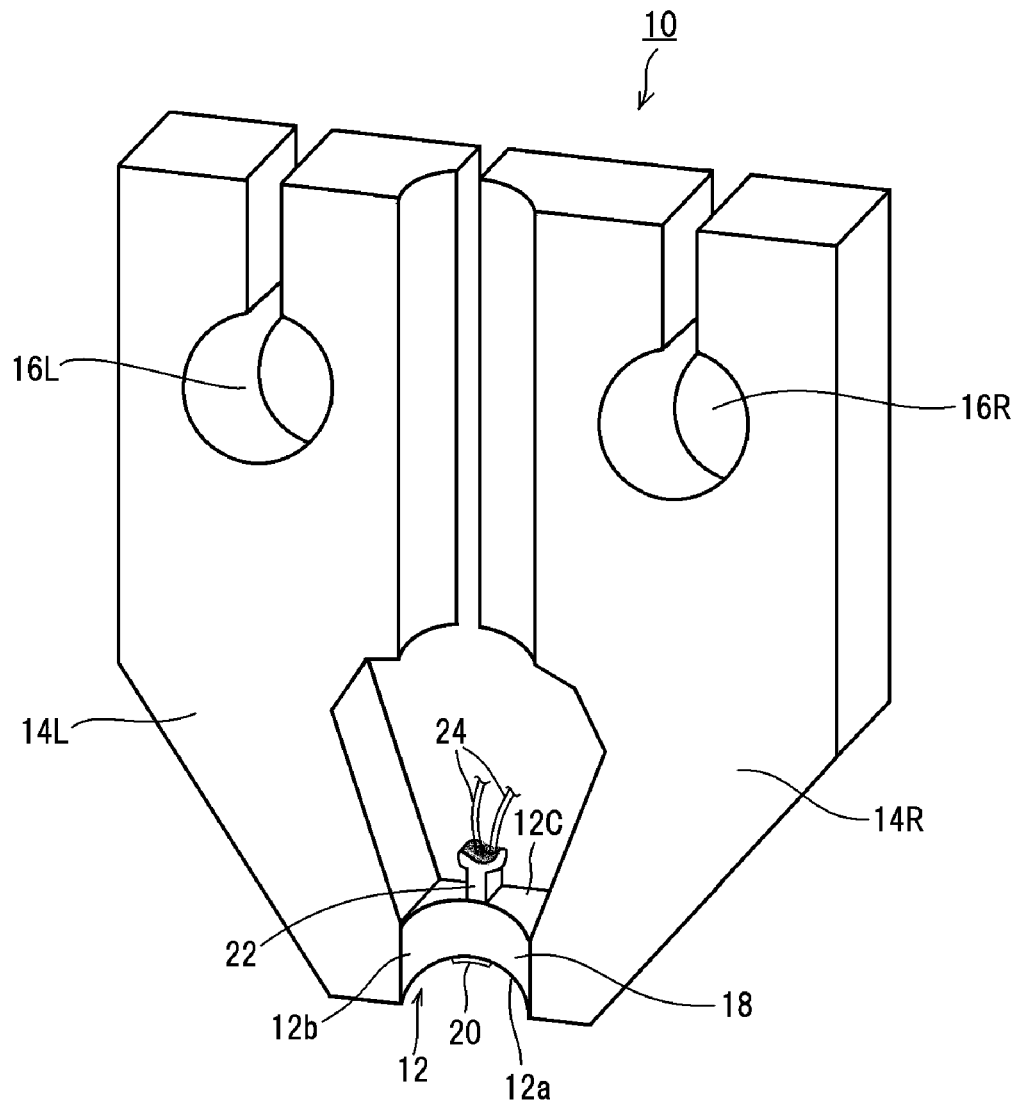
FIG. 1 is a perspective view showing a configuration of a heater chip according to an embodiment of the present invention.
Figure 2:
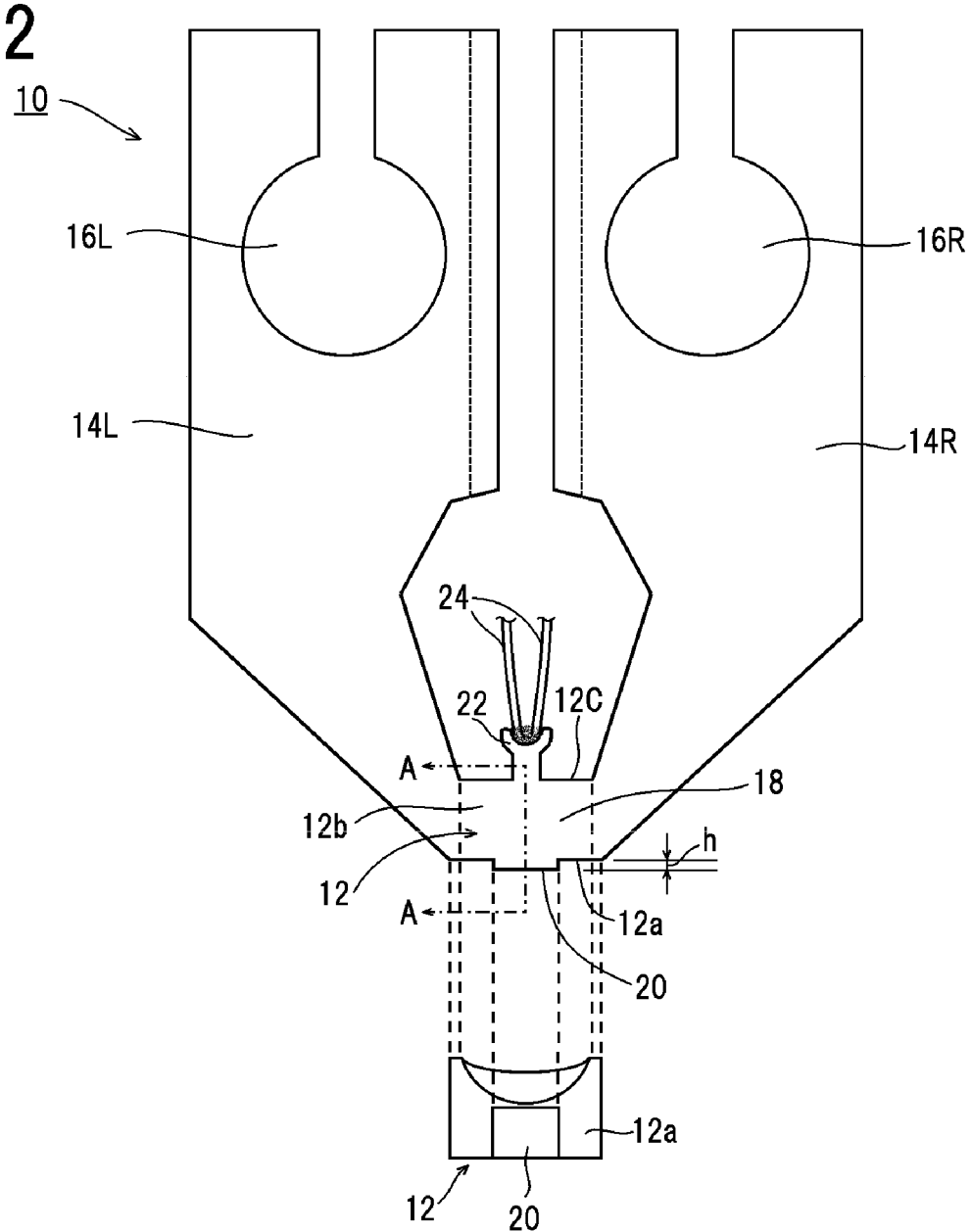
FIG. 2 is a front view of the heater chip.
Figure 3:
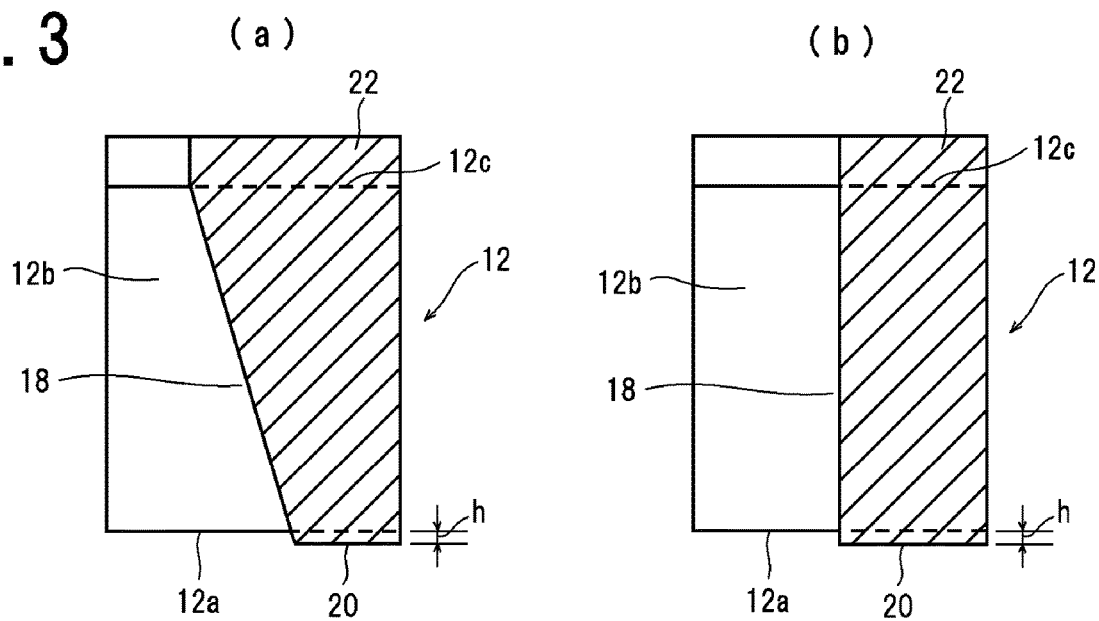
FIG. 3 is a cross-sectional view taken along line A-A of FIG. 2.

FIGS. 1 to 3 show the configuration of a heater chip in accordance with an embodiment of the present invention. FIG. 1 and FIG. 2 are a perspective view and a front view of the heater chip, respectively, and FIG. 3 is a cross-sectional view of the heater chip taken along line A-A of FIG. 2.

The heater chip 10 in this embodiment is made of a hard plate-shaped refractory metal having a thickness of about 3 mm, for example, and is fabricated in a substantially U-shaped as viewed from the front by wire electric discharge machining.

As will be described later, the heater chip 10 comprises an ironing portion having a characteristic structure, which permits the ironing portion to provide a rapid high temperature heat generation characteristic and a cooling characteristic even if the chip material has a low conductance. Therefore, sintered metal (sintered tungsten, for example) or sintered alloy (sintered tungsten alloy, for example) that is advantageous in terms of durability, in particular, abrasion resistance can be suitably used as the material of the heater chip 10.

The heater chip 10 comprises an ironing portion 12 located at the lowermost position in a posture of a normal use mode and a pair of connection terminal portions 14L and 14R formed integrally with the ironing portion 12. The connection terminal portions 14L and 14R increase their cross-sectional areas while extending symmetrically (or asymmetrically) upward from a left and a right ends of the ironing portion 12. Both of the connection terminal portions 14L and 14R are provided with bolt through-holes 16L and 16R at the respective upper end portions.

In the heater chip 10, the ironing portion 12 does not protrude downward from either of the connection terminal portions 14L and 14R. The iron tip face 12a at the lower end of the ironing portion 12 is substantially flush with the lower ends of the connection terminal portions 14L and 14R. Along the path of a current flowing in the heater chip 10 when energized, the ironing portion 12 has a cross-sectional area over the entire length or the entire section thereof equal to or smaller than the cross-sectional areas of any portion of both the connection terminal portions 14L and 14R.

A concave portion 18 is formed on one side face (illustrated as the front face in FIG. 1 and FIG. 2) 12b continuous with the iron tip face 12a of the ironing portion 12. The concave portion 18 is curved in the lateral direction between the left and right ends of the ironing portion 12 so that the depth of the concave is the largest at the center of the concave portion 18. In the longitudinal direction, the concave portion 18 opens at least on the side of the iron tip face 12a at the lower end of the ironing portion and preferably also opens at the side of the upper face or back face 12c opposite to the iron tip face 12 as shown in the drawing. That is, the concave portion 18 extends from the iron tip face 12a to the back face 12c (from the lower end to the upper end of the front face 12b) in the ironing portion 12. In addition, the concave portion 18 preferably extends obliquely (FIG. 3(a)) so that the depth of the concave gradually decreases from the iron tip face 12a toward the upper face or back face 12c opposite to the iron tip face 12a (from a different viewpoint, the cross-sectional area of the ironing portion 12a decreases as it approaches the iron tip face 12a), or extends vertically from the iron tip face 12a to the back face 12c (FIG. 3(b)). The other side face (illustrated as the rear face in FIG. 1 and FIG. 2) of the ironing portion 12 is flush with both the connection terminal portions 14L and 14R.

On the iron tip face 12a of the ironing portion 12, there is formed a flat protruding or convex face portion 20 that is adjacent to the central position in the lateral direction of the ironing portion 12 where the depression of the concave portion 18 is the maximum. The convex face portion 20 is to be polished because of being in direct contact with a conducting metal wire in joining process and of being prone to wear and deterioration. The convex face portion 20 is regularly or occasionally brought into contact with a grindstone when it is polished. The protrusion amount h (FIG. 2, FIG. 3) of the convex face portion 20 is set to, for example, 0.3 mm or less as an initial value so as not to lower the heating function of the ironing portion 12 as much as possible.

A protrusion 22 that projects toward to a height, for example, 1 mm or more is integrally formed on the back face 12c of the ironing portion 12 at the central position in the lateral direction of the ironing portion 12. A thermocouple 24 as a temperature sensor is attached to the protrusion 22. The end portion (temperature measuring end) of the thermocouple 24 is joined to the protrusion 22 by arc welding, for instance.

Figure 19:
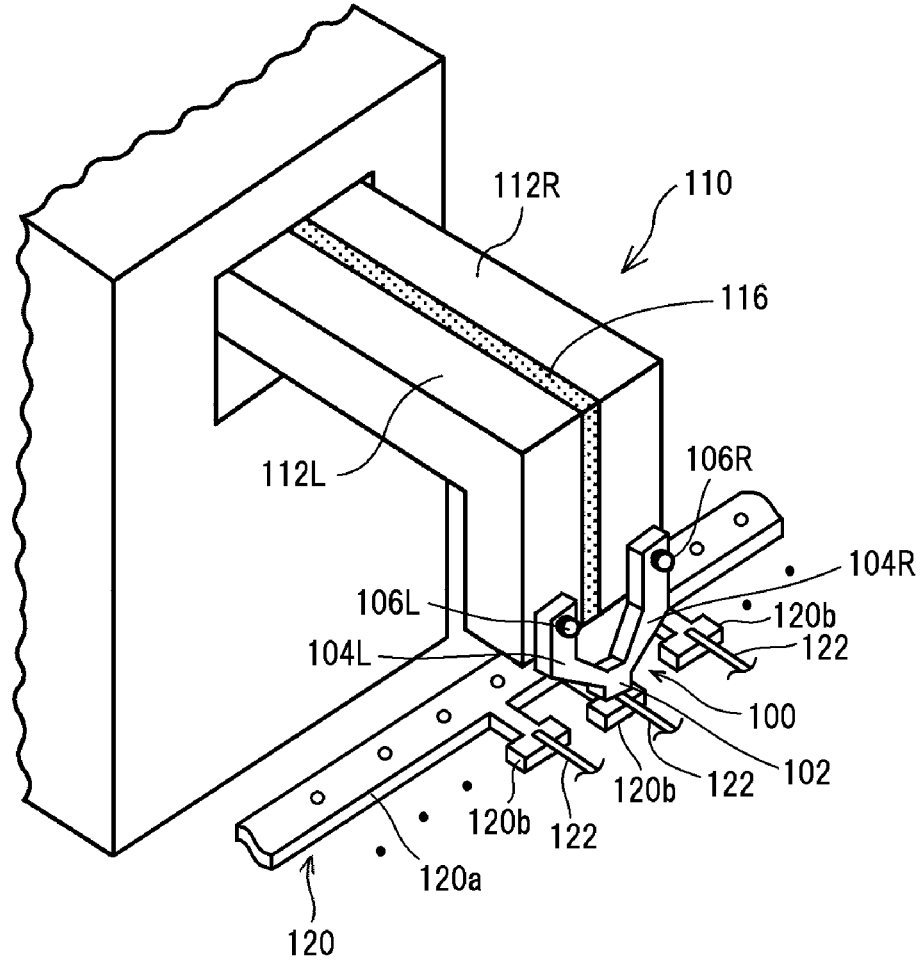
FIG. 19 is a perspective view showing an example of a conventional heater chip and an example of thermo-compression bonding process for temporary fixation using the heater chip.
Figure 20:
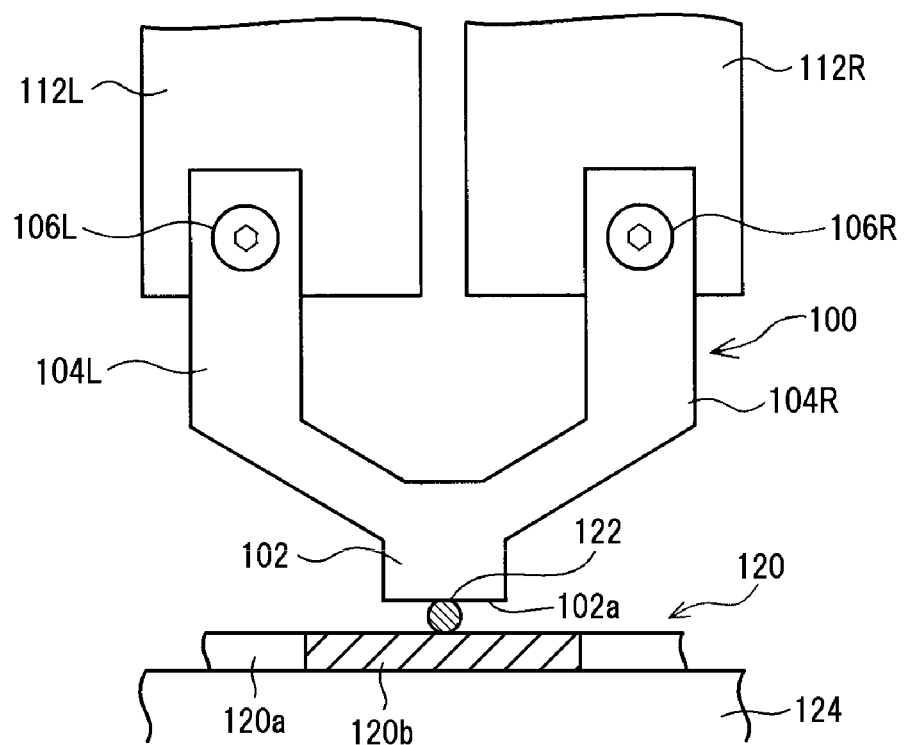
FIG. 20 is a front view showing a state in which the heater chip is energized in the thermo-compression bonding process of FIG. 19.

Like the conventional heater chip 100 (FIG. 19 and FIG. 20), the heater chip 10 is mounted on the heater head 110 (FIG. 19) with bolts 106L and 106R. With respect to a given object to be joined, the heater chip 10 on the heater head 110 is served to perform a predetermined pressurizing and energization heat generation operation under a predetermined processing procedure and conditions.

Figure 4:
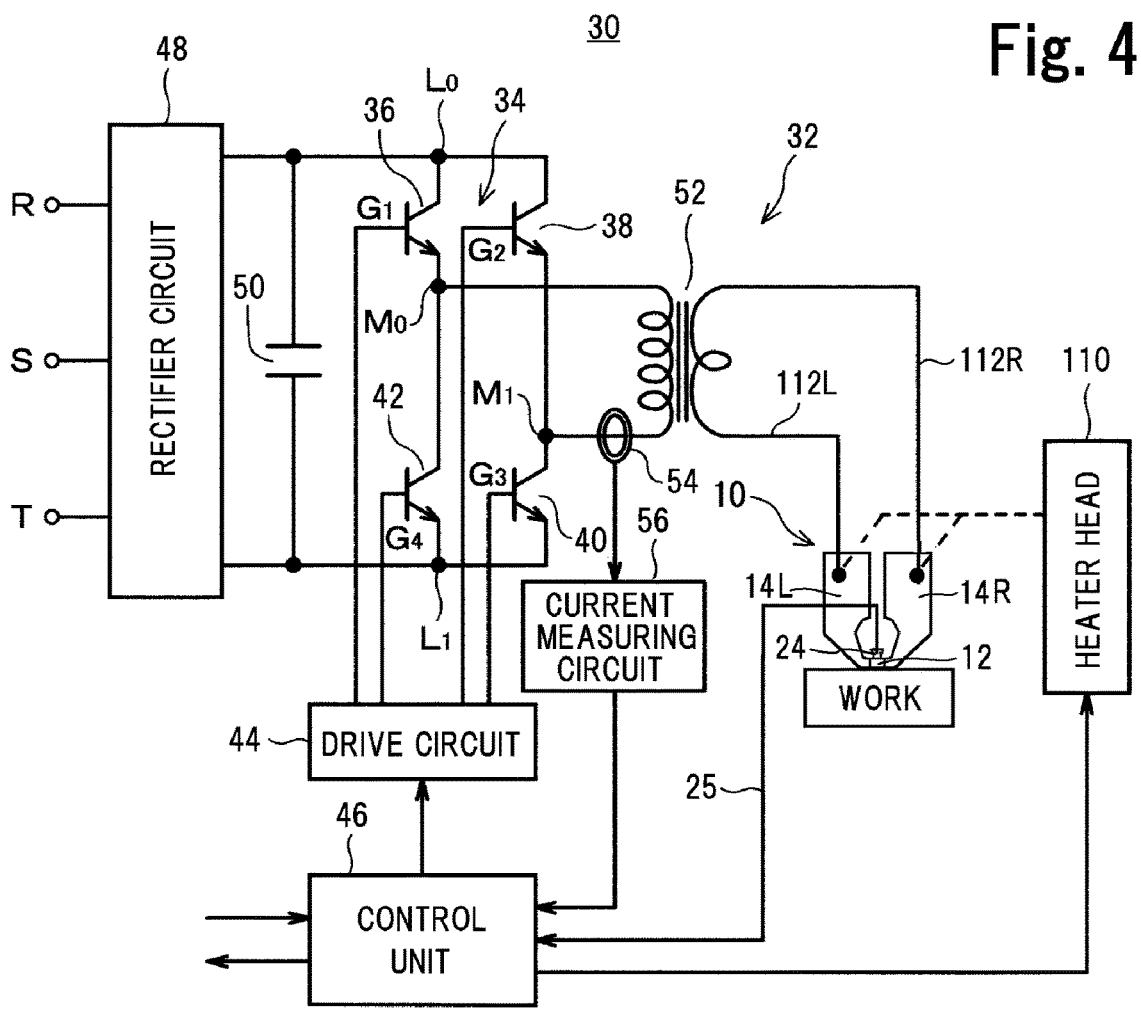
FIG. 4 is a diagram showing the overall configuration of a joining apparatus according to the embodiment.

FIG. 4 shows the overall configuration of the joining apparatus 30 in this embodiment. The joining apparatus 30 includes the heater chip 10 having the above described structure, the heater head 110 for supporting the heater chip 10 and for bringing the ironing portion 12a of the heater chip 10 into pressure contact with the top or upper surface of the object to be joined at the time of joining, a heater power supply 32 for supplying an electric current for resistance heat generation to the heater chip 10, and a control unit 46 for controlling each of the parts and the overall operation of the joining apparatus.

The heater power supply 32 utilizes an AC waveform type inverter power supply circuit. The inverter in this power supply circuit has four transistor switching elements 36,38, 40 and 42 comprising a GTR (giant transistor) or an IGBT (insulated gate-bipolar transistor) or the like.

Of the four switching elements 36 to 42, the switching elements 36 and 40 of the first group (positive polarity side) are driven at the same time with a predetermined inverter (on/off) frequency (for example, 4 kHz) by drive pulses G1 and G3 in phase from the control unit 46 via a drive circuit 44, and the switching elements 38 and 42 of the second group (negative polarity side) are driven at the same time with the same inverter frequency by drive pulses G2 and G4 in phase from the control unit 46 via the drive circuit 44.

The input terminals (L0,L1) of the inverter 34 are connected to the output terminals of a three-phase rectifier circuit 48. The three-phase rectifier circuit 48 rectifies in full-wave a three-phase AC voltage of a commercial frequency input from three-phase AC power supply terminals (R,S,T) to convert it to a DC voltage. The DC voltage output from the three-phase rectifier circuit 48 is smoothed by a capacitor 50 and then applied to the input terminals [L0,L1] of the inverter 34.

The output terminals (M0,M1) of the inverter 34 are connected to both ends of the primary coil of a welding transformer 52. Both the ends of the secondary coil of the welding transformer 52 are connected to the connection terminal portions 22L and 22R of the heater chip 10 via the secondary conductors 114L and 114R, respectively, instead of passing through a rectification circuit.

The control unit 46 includes a microcomputer and performs all controls in the heater power supply 32, for example, energization control (especially inverter control), setting of various heat conditions, display processing, etc. and also for the heat head 110.

In the heater power supply 32, an electric signal (an iron temperature measurement signal) indicative of the temperature of the ironing portion 12 of the heater chip 10 is supplied from the thermocouple 24 attached to the ironing portion 12 of the heater chip 10 to the control unit 46 via an electrical cable 25. In a case where a current feedback control is performed, a current sensor 54 composed of, for example, a current transformer is attached to a conductor of the primary circuit side. From the output signal of the current sensor 54, a measured value (for example, effective value, average value or peak value) of the primary current or the secondary current is obtained in a current measuring circuit 56, and the current measurement signal is provided to the control unit 46.

The joining apparatus 30 comprises the inverter-type heater power supply 32 that provides a high-speed and fine energization control function, and permits the heater chip 10 to maximize its rapid high-temperature heat generation function and rapid cooling function.

[Example Relating to Thermos-Compression Bonding]

Next, an embodiment of joining a conducting wire to a terminal member by thermo-compression bonding using the joining apparatus 30 of the above configuration will be described with reference to FIG. 5 to FIG. 7.

Figure 5:
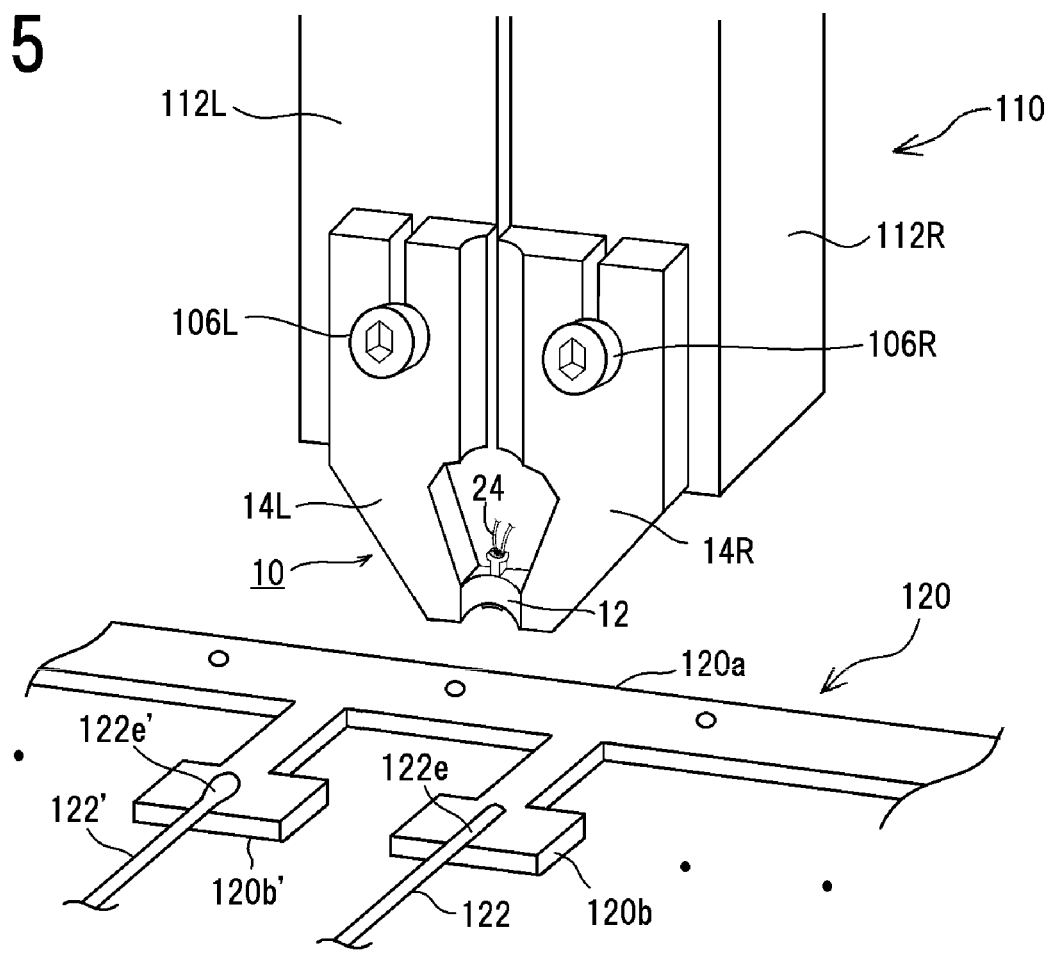
FIG. 5 is a perspective view showing the situation of an example in which a conducting wire is joined to a terminal member by thermo-compression bonding using the above joining apparatus.

As shown in FIG. 5, in this embodiment, similarly to the above-described prior art (FIG. 19 and FIG. 20), a conducting wire 122 extending from an electric component (not shown) or an external circuit (not shown) is joined to a terminal piece portion 120b of the lead frame 120. However, a thermo-compression bonding performed in the embodiment is not one for temporary fixation, but a final joining process requiring no post-process such as laser welding, arc welding or the like.

The conducting wire 122 is, for example, a copper wire or aluminum wire having a wire diameter of 300 μm or less, and may be either a covered wire or a bare wire. As described above, the lead frame 120 is made of a copper alloy (or an iron nickel alloy) and has a rod-like frame portion 120a and a plurality of T-shaped terminal piece portions 120b protruding at regular intervals from one side surface along the length direction of the frame portion 120a.

In the drawing, on the lead frame 120, the left side terminal piece portion 120b' that offsets from directly under the heater chip 10 has already been subjected to the joining process of thermo-compression bonding, in which the distal end portion 122e' of the conducting wire 122 is flattened and is firmly coupled to the corresponding terminal piece portion 120b' by the joining process of thermo-compression bonding (diffusion bonding). On the right side conducting wire 122 located directly under the heater chip 10, there is disposed a conducting wire 122 to be joined thereto in an unprocessed condition.

When the joining apparatus 30 (FIG. 4) is activated, the heater head 110 first operates. By the heater head 110, the heater chip 10 is lowered and the iron tip face 12a (more accurately, the convex face portion 20) of the ironing portion 12 is brought into contact with the top surface of the tip end portion 122e of the conducting wire 122 as shown in FIG. 6(a). Next, the heater power supply 32 (FIG. 4) is activated to start energization of the heater chip 10 while the heater head 110 applies a predetermined pressure or load to the object (122,120b) to be joined through the heater chip 10.

When energization is started, a current I flows through the path of the left side connection terminal portion 14L→the ironing portion 12→the right side connection terminal portion 14R or the opposite direction path in the heater chip 10, and a Joule heat in proportion to the square of the effective value of the current I is generated at each portion of the heater chip through which the current I flows. In this case, since the material of each portion is the same and the electric resistivity is uniform in the heater chip 10, more current concentrates on and more Joule heat generated concentrates on a portion having a smaller cross-sectional area (an area orthogonal to the path of the current) on the above current path.

In the heater chip 10 of this embodiment, the ironing portion 12 has a cross-sectional area equal to or smaller than the cross-sectional area of the connection terminal portions 14L and 14R on the path of the current flowing at the time of energization. Only under such condition of configuration (also under the configuration of the comparative example shown in FIG. 8), the ironing portion 12 generates heat at a sufficiently higher temperature than either of the connection terminal portions 14L and 14R.

Furthermore, in the heater chip 10 of this embodiment, the concave portion 18 having the profile as described above is formed on the one side face 12b of the ironing portion 12. The concave portion 18 permits the cross-sectional area of the ironing portion 12 (especially, the center portion in the right and left direction) to be further narrowed and thereby makes concentration of current or resistance heat on the ironing portion 12 further increase so that the heat generation temperature characteristic and the cooling characteristic of the ironing portion 12 (especially in the vicinity of the iron tip face 12a) are remarkably improved.

More specifically, in the upper part of the ironing portion 12, a part or more of Joule heat generated therein promptly escapes to the outside through the thermocouple 24 whereby a rapid temperature rise therein is suppressed. On the other hand, in the lower portion and the intermediate portion of the ironing portion 12, Joule heat generated is retained therein and then transmitted to the object (122,120b) to be joined through the iron tip face 12a. Therefore, even if the heat drawing on the lead frame is large, the lower portion and the intermediate portion of the ironing portion 12 overcome the heat drawing to raise the temperature of the ironing portion 12. Moreover, as the temperature rises, the resistance increases with a constant temperature coefficient whereby Joule heat further increases. Such positive feedback causes a rapid increase in the temperature of the ironing portion 12, resulting in supply of a sufficient amount of heat to promote diffusion bonding to the object (122,120b) to be joined.

As described above, in the heater chip 10 of this embodiment, the resistance heat generated when a current I flows in the heater chip by energization concentrates on the vicinity of the iron tip face 12a of the ironing portion 12. This permits sintered metal or sintered alloy having relatively low electrical and thermal conductance to be used as the material of the heater chip 10 to steeply raise the iron tip temperature of the ironing portion 12 as shown by the solid line graph F in FIG. 7. Setting the reaching temperature to 1000° C. or more can be also easily realized.

Figure 7:
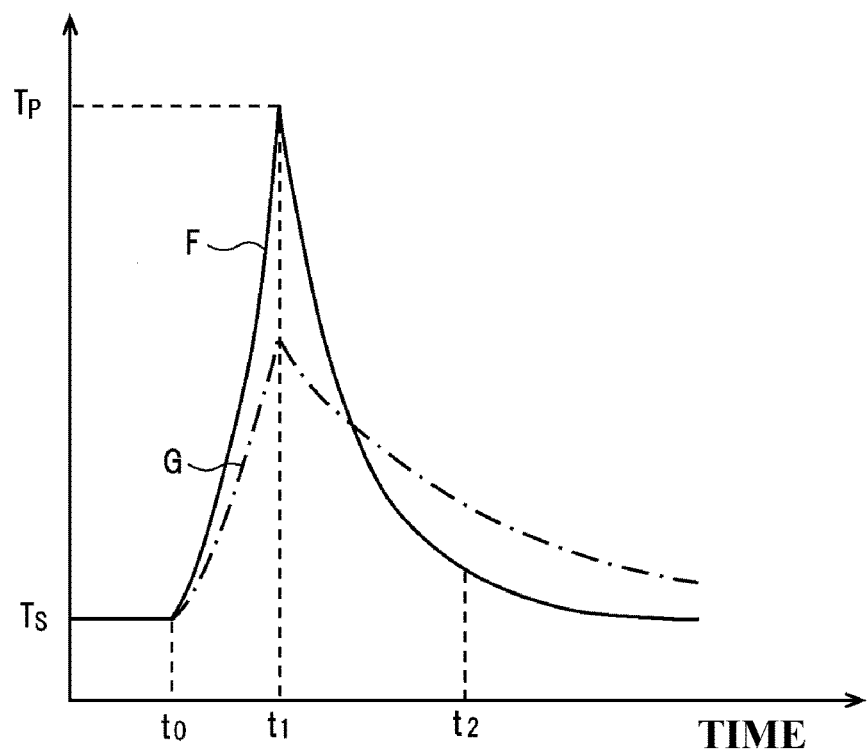
FIG. 7 is a graph showing the iron tip temperature characteristic of the heater chip of the above embodiment in comparison with the iron tip temperature characteristic of a heater chip of a comparative example.

In FIG. 7, t0~t1 on the horizontal axis (time axis) indicates the energization time, Ts on the vertical axis indicates the initial temperature just before starting energization, and Tp indicates the set reaching temperature. As shown in the graph, the steeper the rise in the temperature, the significantly higher the reaching point (peak value) Tp to which the iron tip temperature can reach by the predetermined energization time (t0~t1).

It is to be noted that the characteristic of change with time of the iron tip temperature (temperature waveform) can be acquired by using a temperature measuring instrument of the non-contact type having a high temperature detecting speed, for example, a radiation thermometer. The output (measured temperature) of the thermocouple 24 varies with a certain time delay with respect to the iron tip temperature. In this embodiment, the heat generation temperature in the vicinity of the iron tip face 12a of the ironing portion 10 is high, and the deviation between the measured temperature of the thermocouple 24 attached to the back face 12c of the ironing portion 12 and the actual temperature of the iron tip face 12a is so small that the precision and reliability of the iron tip temperature monitoring by the thermocouple 24 is high.

In this embodiment, as described above, since the heat supplied to the object (122,120b) to be joined from the ironing portion 12 of the heater chip 10 can be raised to a high temperature at a high speed in accordance with the load from the heater head 112, the distal end portion 122e of the wire 122 disposes on the terminal piece portion 120b of the lead frame 120 receives necessary and sufficient heat and pressurizing force at the same time from the heater chip 10 so as to be instantaneously smashed (plastically deformed) as shown in FIG. 6 (a)→(b), thus favorably promoting the diffusion bonding between the conducting wire 122 and the terminal piece portion 122b.

In FIG. 7, t1~t2 on the horizontal axis (time axis) denotes the holding time after energization is stopped. After the hold time has elapsed, the heater chip 10 is raised upward by the heater head 112 as shown in FIG. 6 (c), and then the joining process of thermo-compression bonding is completed. BY the thermo-compression bonding process, the lead wire 60 is stably and firmly joined in full diffusion bonding to the terminal member 64.

In the heater chip 10 of this embodiment, the heat generated is concentrated on the ironing portion 12 (particularly in the vicinity of the iron tip face 12a) during energization, and immediately after stop of energization, the heat is instantaneously transferred from the ironing portion 12 to both the connection terminal portions 14L and 14R as the reaction until then, resulting in that the tip temperature of the ironing portion 12 rapidly drops. Thus, it is capable to shorten the holding time (t1~t2) after stop of energization, and to greatly shorten the time required for thermo-compression bonding process, leading to a great improvement in the production efficiency of the joining apparatus 30 serving to repeatedly carry out the terminal connection processing on the lead frame 120 with a constant tact time.

Figure 8:
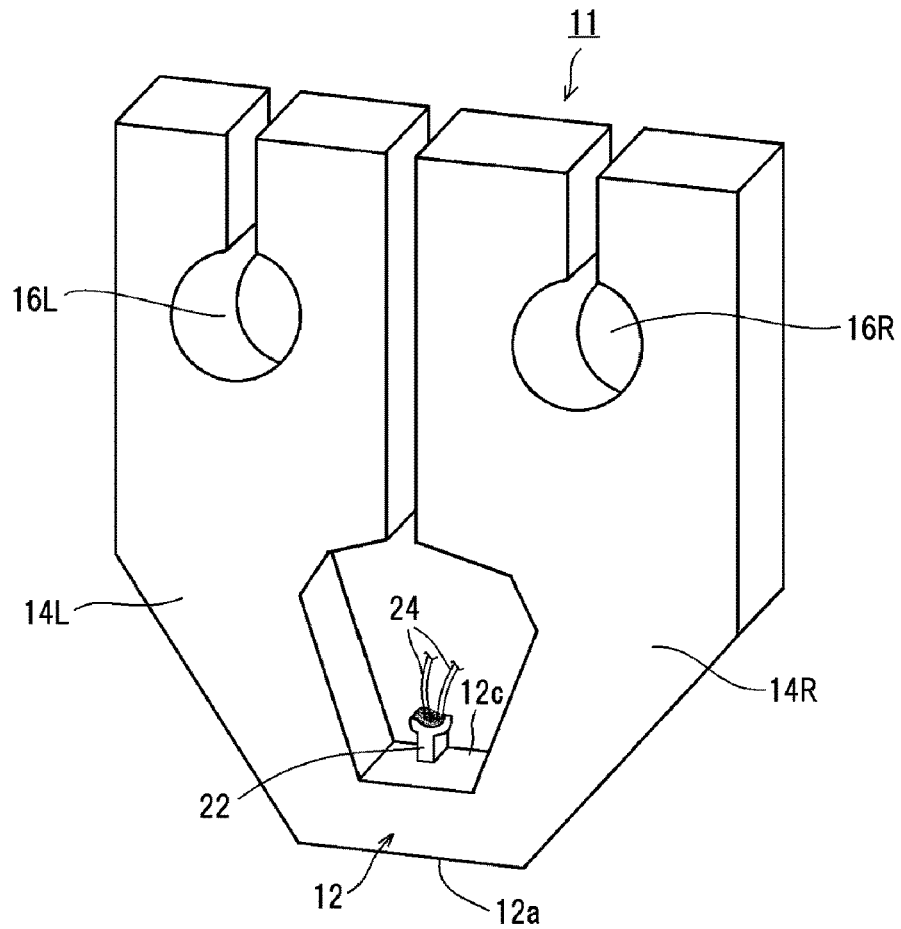
FIG. 8 is a perspective view showing the heater chip of the comparative example.

In FIG. 7, the graph of the imaginary line (dashed line) G shows the iron tip temperature characteristic of a heater chip 11 of a comparative example (FIG. 8). As shown in FIG. 8, the heater chip 11 has the same configuration as the heater chip 10 except for removing the concave portion 18 from the heater chip 10 of the embodiment.

Figure 9:
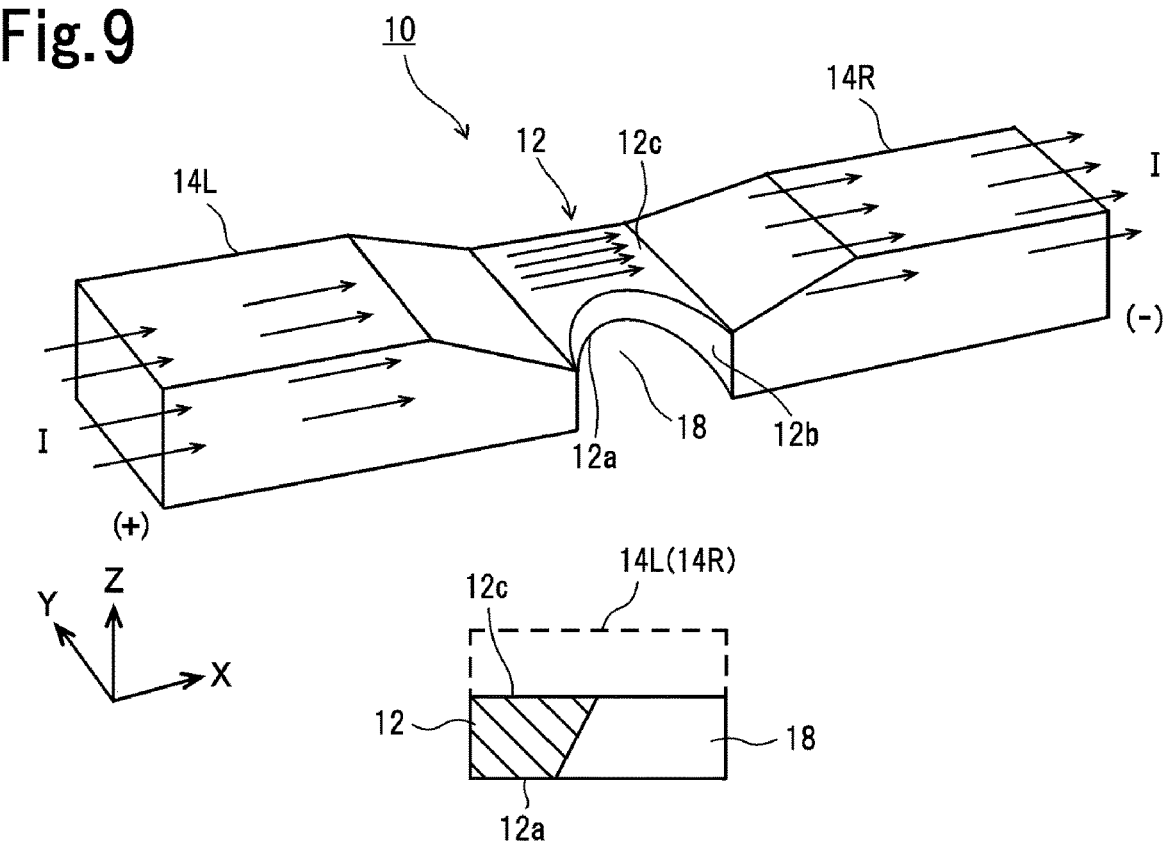
FIG. 9 is a diagram schematically showing the expanded configuration of a main part of the heater chip of the embodiment.
Figure 10:
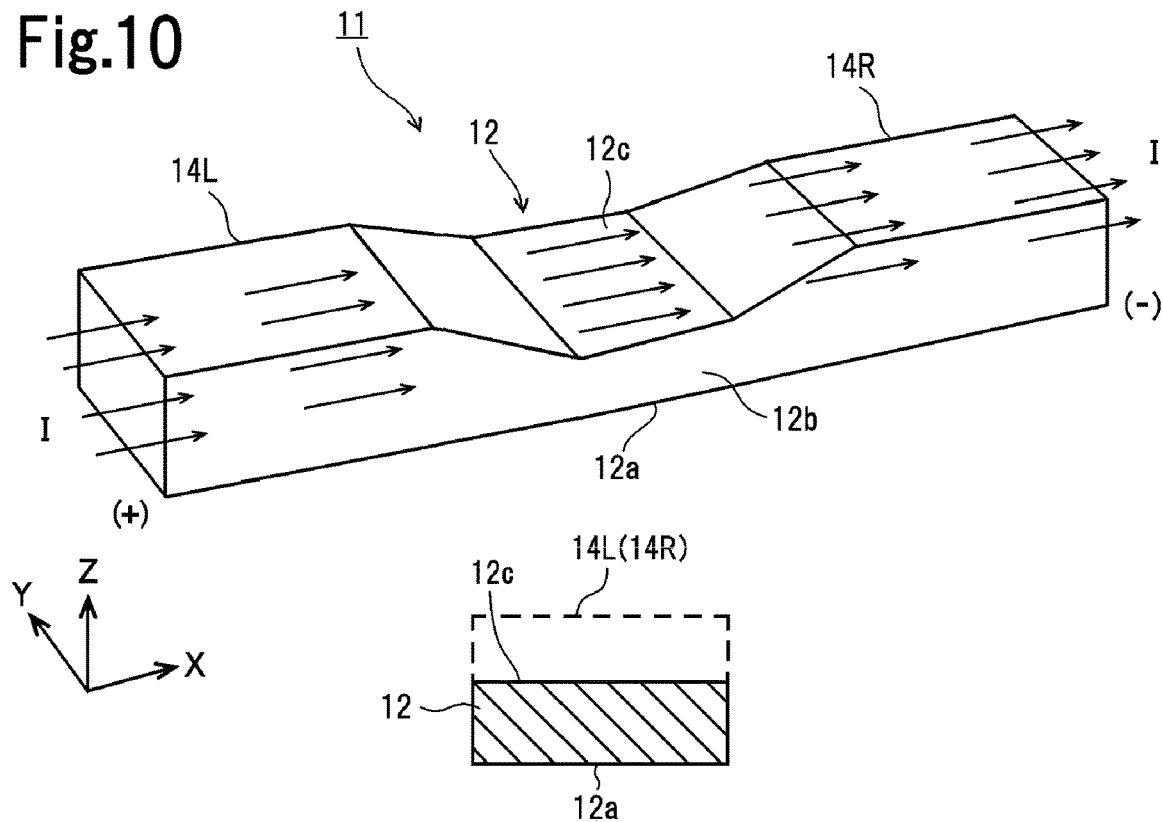
FIG. 10 is a diagram schematically showing the expanded configuration of a main part of the heater chip of the comparative example.

Depending on whether or not the concave portion 18 is provided in the ironing portion 12, a remarkable difference occurs between the ironing tip temperature characteristics of the heater chips 10 and 11. In FIG. 9 and FIG. 10, the configurations around the ironing portions of the heater chips 10 and 11 are shown developed in the transverse direction so that the difference can be understood at a glance.

As shown in FIG. 10, in the heater chip 11 of the comparative example, the ironing portion 12 is constricted only in the X direction and the Z direction in the drawing in continuation to both the connection terminal portions 14L and 14R. Therefore, on the path of the current I flowing in the heater chip, the cross-sectional area of the ironing portion 12 is substantially the same as the cross-sectional area of the thinnest portions (adjacent to the ironing portion 12) of the connection terminal portions 14L and 14R. There is a limitation to concentration of current on the ironing portion 12 (particularly on the vicinity of the iron tip face 12a).

On the other hand, as shown in FIG. 9, in the heater chip 10 of the embodiment, the ironing portion 12 is constricted not only in the X direction and the Z direction in continuation to both the connection terminal portions 14L and 14R, but also in the Y direction in the drawing. Thus, the cross-sectional area of the ironing portion (especially the center portion thereof) is further smaller than the thinnest portions (adjacent to the ironing portion 12) of the connection terminal portions 14L and 14R, and thereby concentration of current on and the resultant concentration of resistance heat on the ironing portion 12 are further strengthened.

Particularly, in the case where the concave portion 18 provided on the ironing portion 12 of the heater chip 10 in the embodiment is configured such that the depth of the concave gradually decreases from the iron tip face 12a to the back face 12c (namely the cross-sectional area of the ironing portion 12 decreases as it approaches the iron tip face 12a), it is capable to more efficiently achieve concentration of current on and the resulting concentration of resistance heat on the vicinity of the iron tip face 12a of the ironing portion 12.

In the heater chip 11 of the comparative example as well, the cross-sectional area of the ironing portion 12 can be made as small as possible by strengthening the restriction of size in the X direction and the Z direction around the ironing portion 12. By strengthening such restriction of size in the X direction and the Z direction, however, the iron tip face 12a and the back face 12c of the ironing portion 12 become so close each other that Joule heat generated in the vicinity of the iron tip face 12a is undesirably absorbed by the thermocouple 24 (FIG. 8) on the side of the back face 12c. As a result, the heating ability of the heater chip 11 is weakened, thus making it impossible to efficiently improve the rising characteristic of the iron tip temperature.

In this respect, the heater chip 10 of the embodiment is configured such that the cross-sectional area of the ironing portion 12 is reduced by decreasing the size in the Y direction orthogonal to the X direction and the Z direction while keeping the distance between the iron tip face 12a and the back face 12c moderate, so that both the heat dissipating function via the thermocouple 24 on the back face 12c side and the heating function for the object to be joined on the iron tip face 12a side can be optimally adjusted, respectively.

Further, in this embodiment, since the concave portion 18 formed in one side surface (front face) 12b of the ironing portion 12 extends from the iron tip face 12a to the back face 12c opposite thereto, the correspondence between the temperature (heating temperature) of the iron tip face 12a and the measured temperature of the thermocouple 24 is good so that the accuracy and reliability of the iron tip temperature monitoring are further improved.

Furthermore, according to the embodiment, in the case where a sintered metal or a sintered alloy such as sintered tungsten is used as the material of the heater chip 10 as described above, no peeling or no cracking occurs even when the iron tip face 12a is consumed and deteriorated by many times of use, thus leading to prolongation of the life of the heater chip 10.

Regarding this point, in the prior art, a tungsten plate with a high conductance produced by hot rolling process is widely used for the material of this type of heater chip. However, since a tungsten plate of the hot rolling type has a laminated structure, an interlaminar peeling or a crack due to the laminated structure tends to occur on the iron tip face in contact with the object to be joined by repeating of the energization heat generation operation (that is, alternative repeating of expansion due to heat generation during energization and contraction accompanying cooling after energization). On the other hand, sintered tungsten has porous structure instead of laminated structure, causing no interlaminar peeling or no cracking in the iron tip face even when the expansion and the contraction are repeated many times.

According to the embodiment, in addition, when cleaning the iron tip face 12a, it is only needed to polish the region of the convex surface portion 20, which is a minimum polishing operation. It is also possible to omit the convex portion 20 from the heater chip 10, that is, to form the whole of the iron tip face 12a as a flat surface.

In the embodiment, as described above, the heater chip 10 that comprises the ironing portion 12 and the pair of the connection terminal portions 14L and 14R integrally extending symmetrically or asymmetrically from the left and right ends of the ironing portion 12 is configured such that on the path of the current flowing at the time of energization, the cross-sectional area of the ironing portion 12 is constricted to not more than the cross-sectional areas of the connection terminal portions 14L and 14R, and the concave portion 18 is formed on at least one side surface of the ironing portion 12. With such configuration, the energization heat generation characteristic and the temperature characteristic (rising characteristic and falling characteristic) of the ironing portion 12 can be greatly improved, and joining of a thin conducting wire to a terminal member can be performed stably and reliably by a short time of thermo-compression bonding process. Accordingly, it is capable to achieve a great improvement in the quality and productivity of the joining process in the joining apparatus of the mass production type.

OTHER EMBODIMENTS AND MODIFICATIONS

With reference to FIGS. 11 to 18, other embodiments and modifications regarding the invention will be described below.

Figure 11:
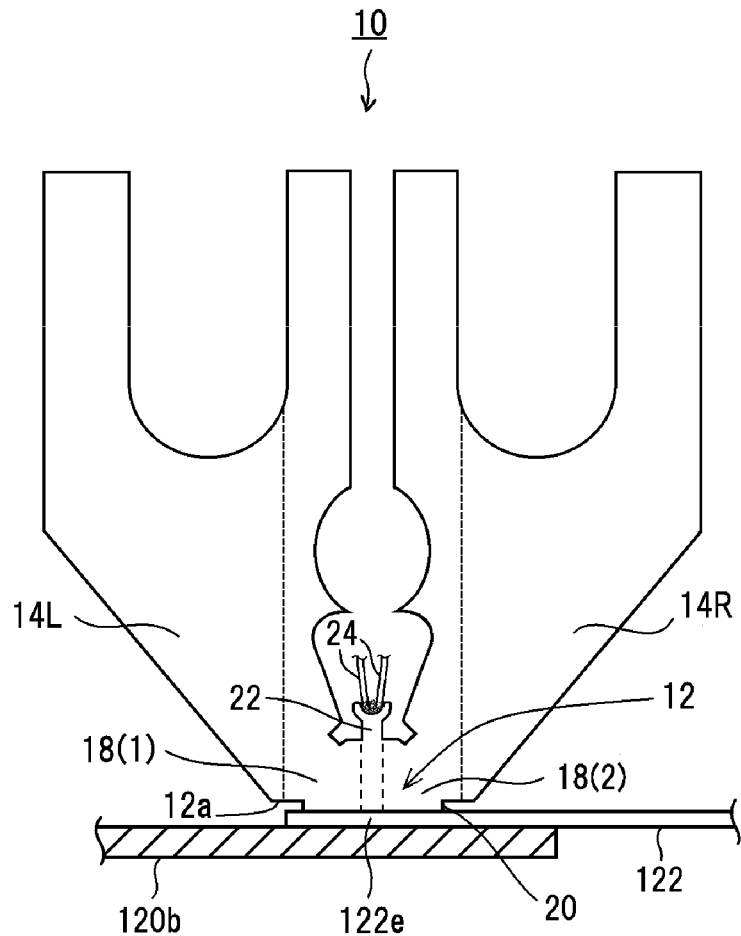
FIG. 11 is a front view showing the configuration of a heater chip according to a modified example.
Figure 12:
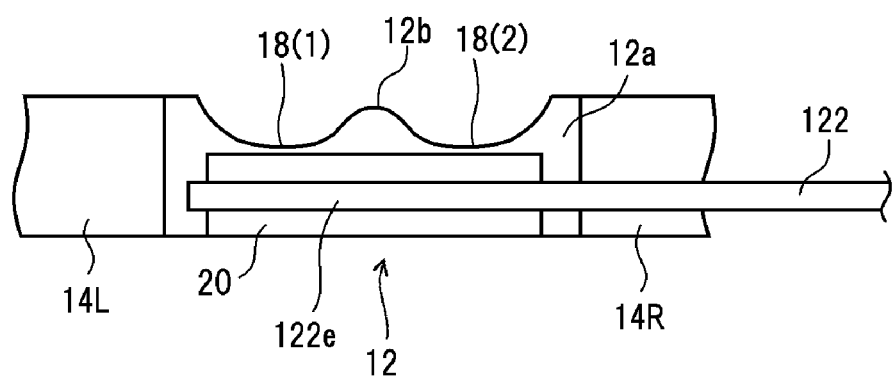
FIG. 12 is a partially enlarged bottom view of the configuration of the ironing portion of the heater chip of FIG. 11 as viewed from the bottom.

FIG. 11 and FIG. 12 show a configuration of a modified example in which the ironing portion 12 is elongated in the left and right direction of the heater chip 10 of the above embodiment. FIG. 11 is a front view of the heater chip 10, and FIG. 12 is a partially enlarged bottom view showing the heater chip 10 around the iron tip face 12a as viewed from the bottom.

In the modified example, the concave portion 18 formed in the ironing portion 12 is made intricate with concave and convex so as to maximize the depth of the concavity at a plurality of places (two places in the illustrated example) 18(1) and 18(2) in the left-right direction. The iron tip face 12a (in particular, the convex face portion 20) is aligned in such a manner that the left-right or longitudinal direction of the iron tip face 12a is in parallel with the extending direction of the conducting wire 122.

At the time of energization, the heat supplied to the conducting thin wire 60 from the iron tip face 12a (convex face portion 20) is dispersed in the longitudinal direction of the iron tip face 12a (the convex face portion 20) so as to be maximum at the plurality of deepest portions 18(1) and 18(2) of the concave portion 20. Therefore, a uniform diffusion bonding is extensively obtained between the conducting thin wire 60 and the terminal member 64.

Figure 13:
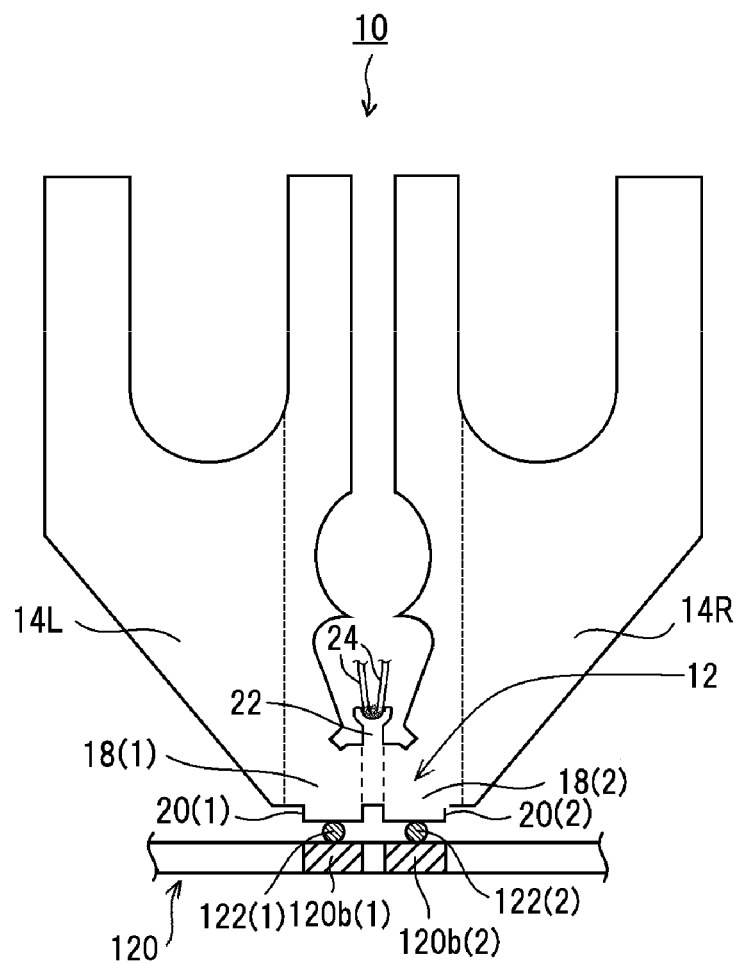
FIG. 13 is a front view showing the configuration of a heater chip according to another modified example.
Figure 14:
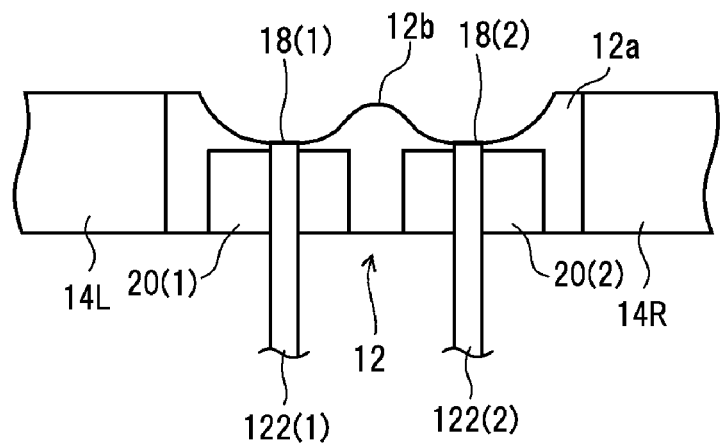
FIG. 14 is a partial enlarged bottom view of the configuration around the ironing portion of the heater chip of FIG. 13 as viewed from the bottom.

FIG. 13 and FIG. 14 show a configuration of a modified example in which the iron tip portion 12a or the convex face portion 20 of the ironing portion 12 is divided into a plurality of portions in the left and right direction. FIG. 13 is a front view of the heater chip 10, and FIG. 14 is a partially enlarged bottom view of the heater chip 10 around the iron tip face 12a as viewed from the bottom.

Also in this embodiment, the concave portions 18 is formed to be uneven so that the depth of the concavity is maximum at a plurality of places (two places in the illustrated example) 18(1) and 18(2). Further, independent (divided) convex face portions 20(1) and 20(2) are formed on the iron tip face 12a at positions adjacent to the deepest portions 18(1) and 18(2). These individual convex face portions 20(1) and 20(2) are brought into contact with the individual conducting wires 122(1) and 122(1), respectively. By energizing the heater chip 10 once, the plurality of conducting wires 122(1) and 122(1) are joined to the corresponding plurality of terminal piece portions 120b(1) and 122b(1), respectively. According to this modified example, collectively or simultaneously joining the plurality of conducting wires 122(1) and 122(1) to the plurality of terminal piece portions 120b(1) and 122b(l) can be carried out using the single heater chip 10.

Figure 15:
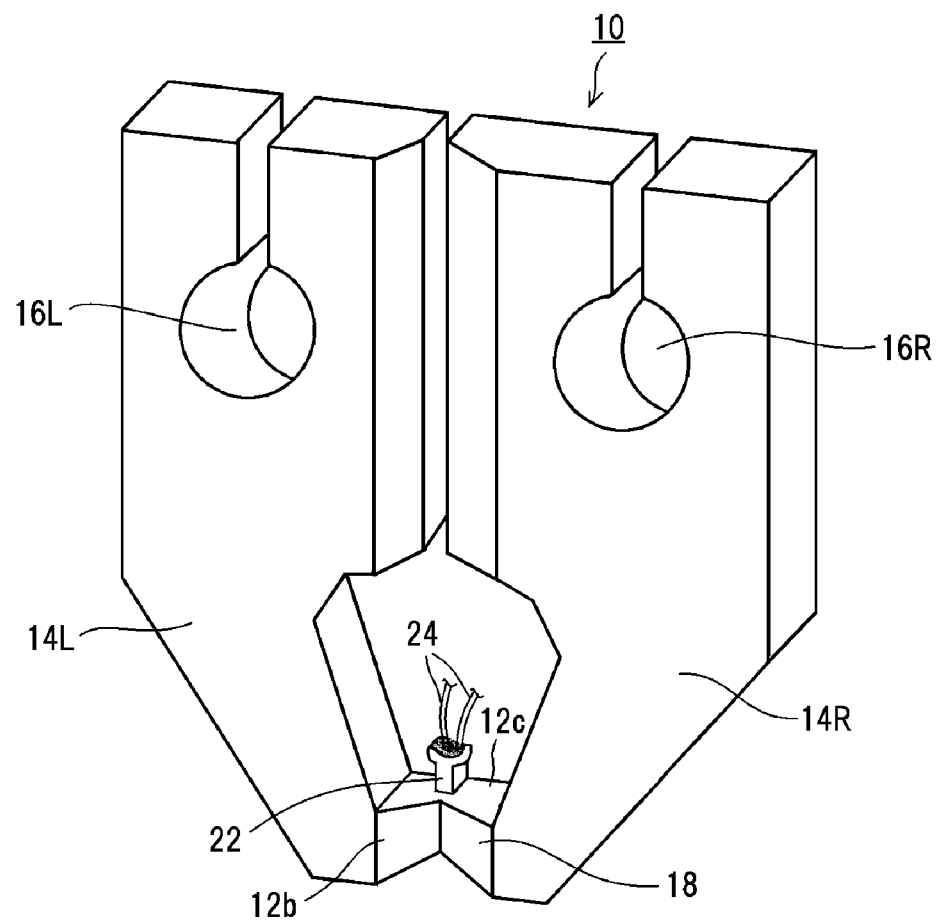
FIG. 15 is a perspective view showing the configuration of a heater chip according to another modified example.
Figure 16:
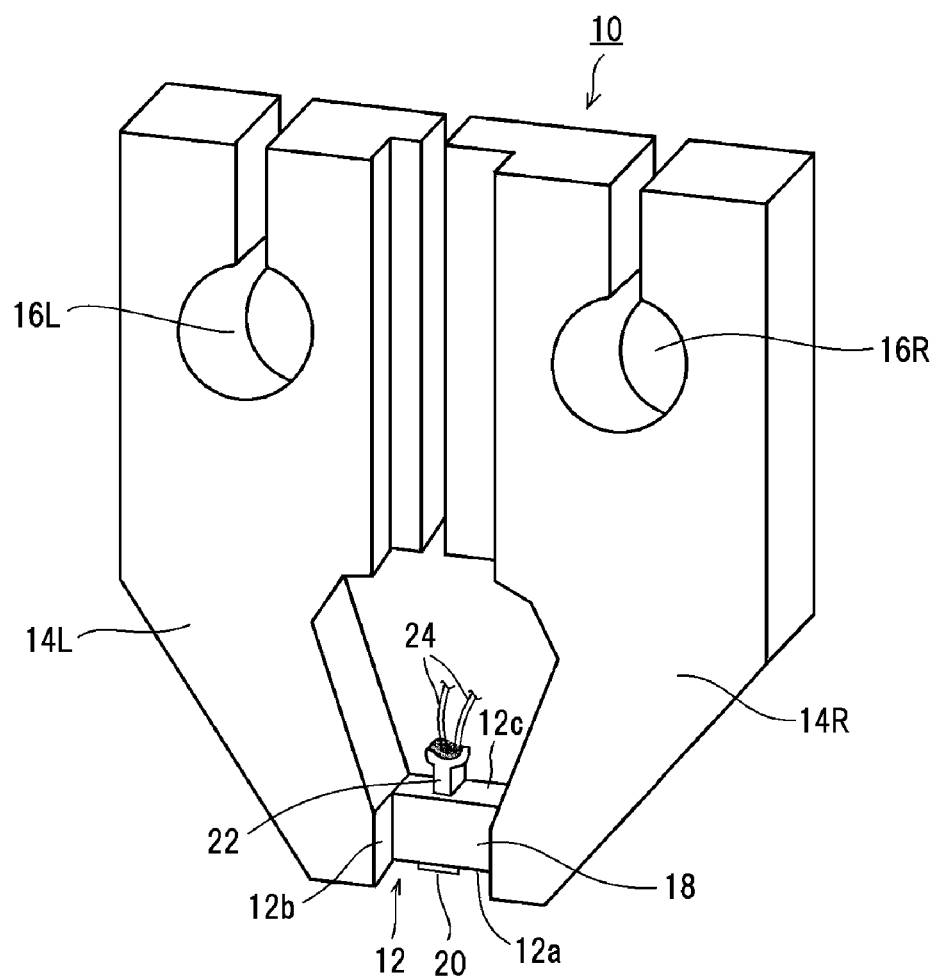
FIG. 16 is a perspective view showing the configuration of a heater chip according to another modified example.

FIG. 15 and FIG. 16 show another modified example regarding the profile of the concave portion 18 formed in the ironing portion 18 of the heater chip 10 in accordance with above embodiment. As shown in FIG. 15, it is capable to select a configuration in which the concave portion 18 is recessed in a V-shape in the lateral direction of the ironing portion 12. As shown in FIG. 16, a configuration in which the depth of the concave portion 18 is made constant in the left and right direction of the ironing portion 12 is also capable to adopt. In this way, various kinds of deformation on the profile of the concave portion 18 can be made. Although not shown in the drawings, it is further possible to form the concave portions 18 on both the side faces (the front face and the opposite or rear face in the drawings) of the ironing portion 12.

In order to maintain the accuracy and stability of the temperature measurement function using the thermocouple 24, it is undesirable to provide a concave or other recess on the back face 12c of the ironing portion 12 to which the thermocouple 24 is attached. It is preferable that the back face 12c is flat like the iron tip face 12a or the convex face portion 20.

Figure 17:
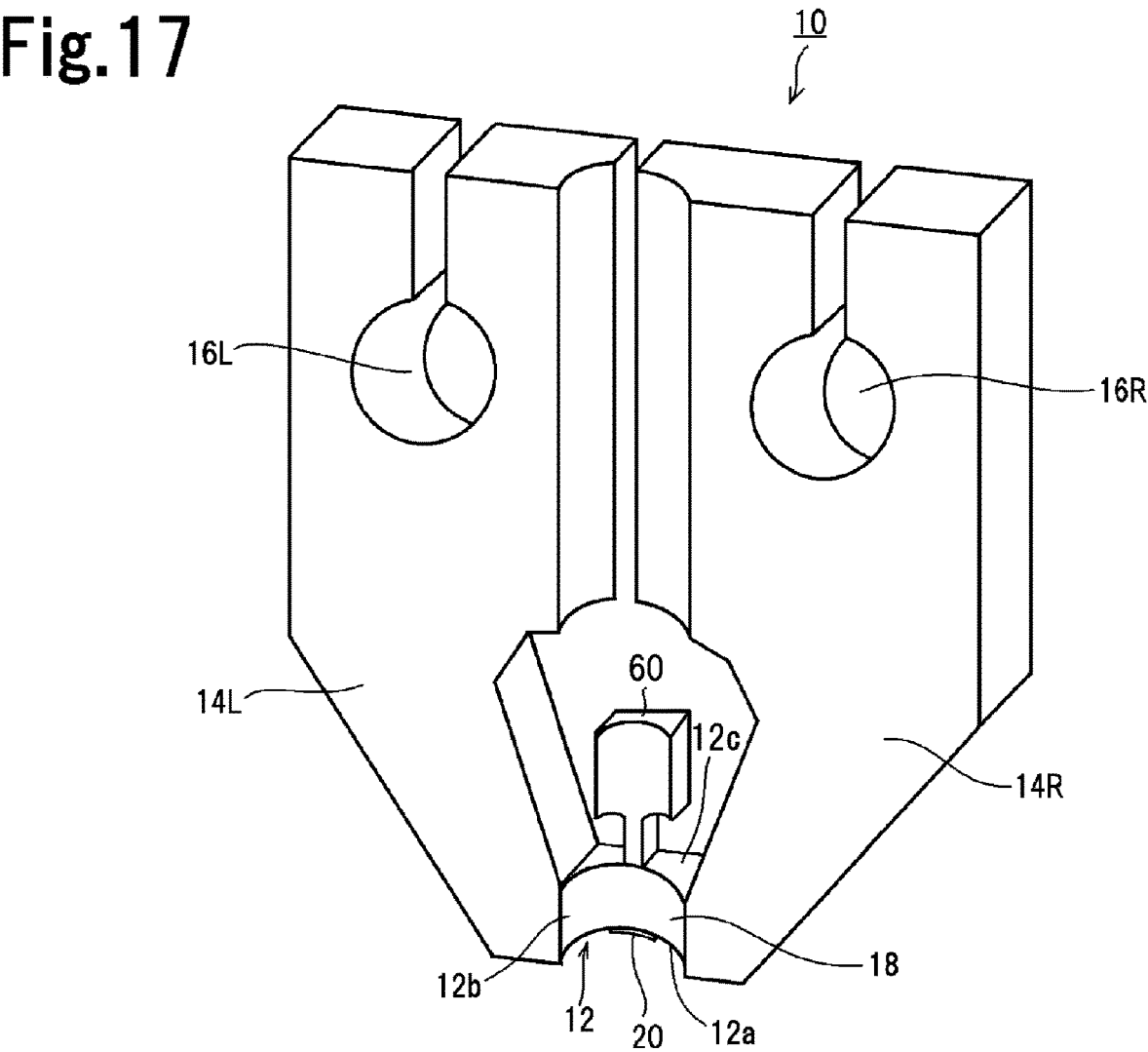
FIG. 17 is a perspective view showing the configuration of a heater chip according to another modified example.

FIG. 17 shows an example of a configuration in which a heat radiation member 60 is attached to the back surface 12c of the ironing portion 12 in the heater chip 10 of the above embodiment. The heat radiation member 60 is made of the same material as that of the heater chip 10 and is integrally formed on the back face 12c of the ironing portion 12. In order to enhance heat dissipating into the atmosphere therefrom, the heat radiation member 60 is preferably formed into a fin-like (or block-like) shape as shown in the drawing, or it may be gold-plated on the surface thereof. When the heater chip 10 is energized, Joule heat generated in the vicinity of the back face 12c of the ironing portion 12 is promptly discharged into the atmosphere via the heat radiation member 60. In other words, the same heat release effect as in the case where a thermocouple is attached on the back face 12c of the ironing portion 12 is exerted. It is to be noted that a structure in which the heat radiation member 60 and the thermocouple (24) are provided together on the back face 12c of the ironing portion 12 can be selected, and that thermocouple (24) may be attached to any one of the connection terminal portions 14L and 14R even though the measurement accuracy decreases.

Figure 18:
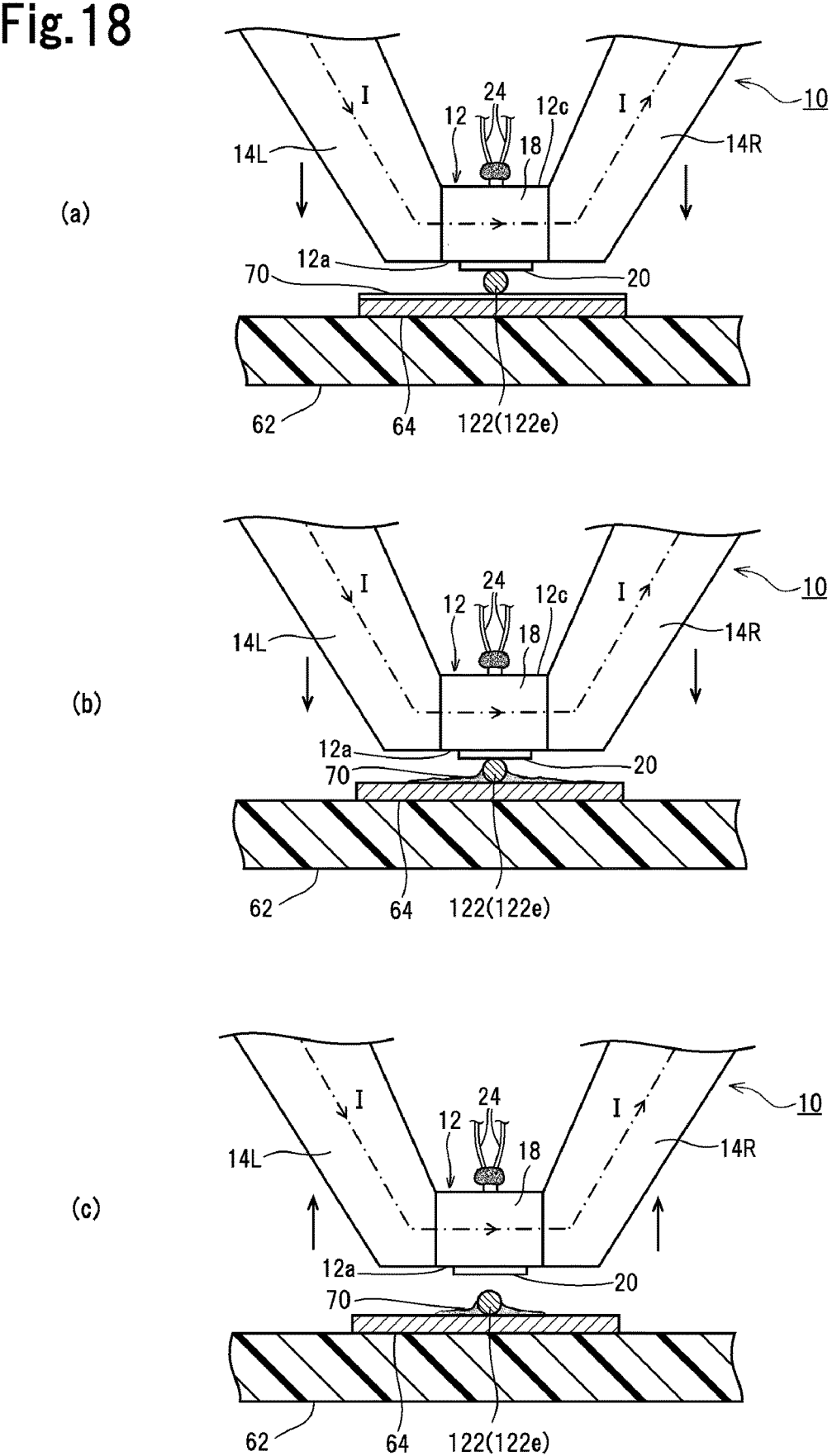
FIG. 18 is a view showing each step of a process of joining a conducting wire to a terminal member by reflow soldering using the joining apparatus in the above embodiment.

With reference to FIG. 18, there will be described an embodiment in which a conducting wire 122 is joined to a terminal member (wiring conductor) 64 on a ceramic substrate 62 by reflow soldering using the joining apparatus 30 and the heater chip 10 of the above embodiment. In general, the material of this type of terminal member 64 is silver or silver alloy.

In this case, creamy solder or plating solder 70 is applied to the surface of the terminal member 64 in advance. The tip portion 122a of the conducting wire 122 is disposed on the terminal member 64. When the heater chip 10 is lowered by the heater head 110 (FIG. 4), the iron tip portion 12a (convex face portion 20) of the ironing portion 12 comes in contact with the conducting wire 122 on the terminal member 64 with an appropriate pressurizing force as shown in FIG. 18(a). Under the state where the ironing portion 12 of the heater chip 10 is pressed against the object (122,64) to be joined, when the heater power supply 32 (FIG. 4) is turned on to supply a current I to the heater chip 10, the ironing portion 12 of the heater chip 10 generates heat intensively in the vicinity of the iron tip portion 12a so as to heat the object (122,64) to be joined. However, because of carrying out a reflow soldering, the heating temperature is controlled to 700° C. or lower, for example. In this case, the heat drawings on the object (122,64) to be joined and on the ceramic substrate 62 are considerably large. However, in the ironing portion 12 of the heater chip 10, the heat generated in the vicinity of the iron tip face 12a overcomes the heat drawing and raises the temperature rapidly while raising the resistance value. As a result, the insulating coating of the conducting wire 122 melts due to heat and comes off, and the solder 70 around the conducting wire 122 rapidly melts. As shown in FIG. 18(b), the melted solder 70 rises somewhat to climb up along the exposed surface of the conducting wire 122. When a certain period of time (energization time) has elapsed, the heater power supply stops energization. After a lapse of another certain period of time (holding time), the heater head 110 raises the heater chip 10 to separate from the object (122,64) to be joined as shown in FIG. 18 (c). Then, the solder 70 solidifies so that the object (122,64) has been joined by soldering.

In this embodiment, since responsiveness of energization heat generation of the heater chip 10 is very excellent, it is permitted to control at high speed and finely the heat to be supplied to the object (122, 64) to thereby improve the processing quality of the reflow soldering.

EXPLANATIONS OF LETTERS OR NUMERALS 10 heater chip
12 ironing portion
12a iron tip face
12b one side face
14L,14R connection terminal portion
18 concave portion
20 convex portion
24 thermocouple
30 joining apparatus
32 heater power supply
60 heat radiation member
62 ceramic substrate
64 terminal member (wiring conductor)
110 heater head
120 lead frame
120b terminal piece portion
122 conducting wire

The invention claimed is:

1. A heater chip for joining a conducting wire to a terminal member by thermo-compression bonding, comprising:
    an ironing portion that abuts or comes into contact with one end portion of the conducting wire disposed on the terminal member; and
    a pair of connection terminal portions that are integrally formed with the ironing portion and that extend symmetrically or asymmetrically upward from the left and right ends of the ironing portion so as to make a physical and electrical connection with power feeding conductors from a heater power supply;
    wherein the ironing portion has an iron tip face opposed to the conducting wire and the terminal member, and a side face continuous with the iron tip face and having a concave portion for current concentration; and
    wherein the ironing portion has a cross-sectional area over the entire section thereof equal to or smaller than the cross-sectional areas of the connection terminal portions on the path of a current flowing when energized, and does not protrude downward from the lower ends of the connection terminal portions, and
    wherein the concave portion opens at the iron tip face of the ironing portion, and extends to and opens at a back face of the ironing portion opposite to the iron tip face.

2. The heater chip of claim 1 wherein the iron tip face of the lower end of the ironing portion is substantially flush with the lower ends of the connection terminal portions.

3. The heater chip of claim 1 wherein the concave portion is recessed so that the depth of the concavity is maximized at the center portion in the left and right direction of the ironing portion.

4. The heater chip of claim 1 wherein the concave portion is formed to be uneven so that the depth of the concavity are maximum at a plurality of places in the left and right direction of the ironing portion.

5. The heater chip of claim 1 wherein the concave portion has a constant depression depth in the left and right direction of the ironing portion.

6. The heater chip of claim 1 wherein a temperature sensor is attached to the central position in the left and right direction of the back face of the ironing portion.

7. The heater chip of claim 6 wherein the temperature sensor comprises a thermocouple.

8. The heater chip of claim 6 wherein the concave portion has a symmetrical shape with respect to the center position.

* * * * *